US005475621A

United States Patent [19]

Lee et al.

[11] Patent Number: 5,475,621

[45] Date of Patent: Dec. 12, 1995

[54] DUAL MODE TIMER-COUNTER

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 165,134

[22] Filed: Dec. 9, 1993

[51] Int. Cl.[6] .................... G06F 17/00

[52] U.S. Cl. .................... 364/569

[58] Field of Search .................... 364/569; 395/775

[56] References Cited

U.S. PATENT DOCUMENTS

| | | | |
|---|---|---|---|
| 4,395,756 | 7/1983 | Daniels | 364/200 |
| 4,644,498 | 2/1987 | Bedard et al. | 364/900 |
| 4,816,823 | 3/1989 | Polkinghome et al. | 340/825.15 |
| 5,097,437 | 3/1992 | Larson | 395/775 |

*Primary Examiner*—Edward R. Cosimano
*Attorney, Agent, or Firm*—Charles G. Parks, Jr.; Melvin J. Scolnick

[57] ABSTRACT

A programmable timer circuit which is integrated into an application specific integrated circuit includes a programmable timer counter. The programmable timer counter receives count data which is written to registers of the integrated circuit and is caused to initiate a count until that count is reached in response to clock signal. A programmable microprocessor is provided for controlling the programmable timer circuit and reading count data and mode data from non-volatile memory units in response to the microprocessor's programming and writing the count data and mode data into the registers of the application specific integrated circuit. In response to the mode data the programmable timer circuit assumes either a one shot mode or a continuos mode when the programmable timer.

2 Claims, 5 Drawing Sheets

DUAL MODE TIMER-COUNTER

The following co-pending applications are commonly assigned to Pitney Bowes Inc., filed concurrently on Dec. 9, 1993, U.S. patent application Ser. No. 08/163,627, entitled MULTIPLE PULSE WIDTH MODULATION CIRCUIT; U.S. patent application Ser. No. 08/137,460, entitled DYNAMICALLY PROGRAMMABLE TIMER-COUNTER; U.S. patent application 5,377,264 issued on Dec. 27, 1994, entitled MEMORY ACCESS PROTECTION CIRCUIT WITH ENCRYPTION KEY; U.S. patent application Ser. No. 08/163,811, entitled MEMORY MONITORING CIRCUIT FOR DETECTING UNAUTHORIZED MEMORY ACCESS; U.S. patent application Ser. No. 08/163,771, entitled MULTI-MEMORY ACCESS LIMITING CIRCUIT FOR A MULTI-MEMORY DEVICE; U.S. patent application Ser. No. 08/163,790, entitled ADDRESS DECODER WITH MEMORY ALLOCATION FOR A MICRO-CONTROLLER SYSTEM; U.S. patent application Ser. No. 08/163,810, entitled INTERRUPT CONTROLLER FOR AN INTEGRATED CIRCUIT; U.S. patent application Ser. No. 08/163,812, entitled ADDRESS DECODER WITH MEMORY WAIT STATE CIRCUIT; U.S. patent application Ser. No. 08/163,813, entitled ADDRESS DECODER WITH MEMORY ALLOCATION AND ILLEGAL ADDRESS DETECTION FOR A MICRO-CONTROLLER SYSTEM; U.S. patent application Ser. No. 08/164,100, entitled PROGRAMMABLE CLOCK MODULE FOR POSTAGE METERING CONTROL SYSTEM; and U.S. patent application Ser. No. 08/163,629, entitled CONTROL SYSTEM FOR AN ELECTRONIC POSTAGE METER HAVING A PROGRAMMABLE APPLICATION SPECIFIC INTEGRATED CIRCUIT, unless otherwise noted, all of which patent applications are now pending.

BACKGROUND OF THE INVENTION

The present invention relates to a timer circuit, and more specifically, to a timer circuit for an integrated circuit arrangement.

It is customary to develop a unique control system for each specific model of an apparatus. For example, in the electronic postage meter area, each postage meter model has a micro-controller system specifically designed for controlling the function set of that electronic postage meter model. The micro-controller system is customarily comprised of a microprocessor in bus communication with a number of memory units and an applications specific integrated circuit (ASIC). It is now considered advantageous to develop a single micro-controller for a plurality of meter models which will offer the advantages of allowing one micro-controller to be utilized in a number of meters resulting in less variations in meter design and better design control for the manufacturer.

One of the principle obstacles is that each microprocessor control system is constrained to performance limitation of specific integrated circuit components, such as, the write rate to non-volatile memory units, baud rate to peripheral units. As a result, it is conventional to provide the necessary circuit timers with fixed mode operation, i.e., continuous or one-shot, for a specific control operation. It is recognized that because the timer is so constrained within the control circuit that only like timed events may be logically connected to that timer.

SUMMARY OF THE INVENTION

It is an objective of the present invention to present a microprocessor control system employing a microprocessor in bus communication with a ASIC and a plurality of memory units, the ASIC having a programmable timer module which can be programmed to operate in either a continuous or one-shot mode.

The micro-controller system is comprised of a microprocessor which is in bus communication with a number of memory units and an ASIC. The ASIC includes a number of system modules, for example, a non-volatile memory security module, a printhead controller module, a pulse width modulation module, etc. One of the modules of the ASIC is a timer circuit module. The timer circuit module includes a plurality of registers which can be addressed to enable writing of timer data into the module. One of the timer registers is a timer control register and an input data register is also included. In response to data written in the timer control register, a continuous or one-shot mode is selected and, also, the timing period. The timer circuitry either enables the system clock to clock the timer single time-out in the one-shot mode or sequentially re-enables the system clock to clock the timer for a uninterrupted second and subsequent time-out by retriggering. During retriggering of the timer, timer data written to the timer input registers is reloaded to the timer.

DETAILED DESCRIPTION OF THE PREFERRED EMBODIMENT

Figure 1:
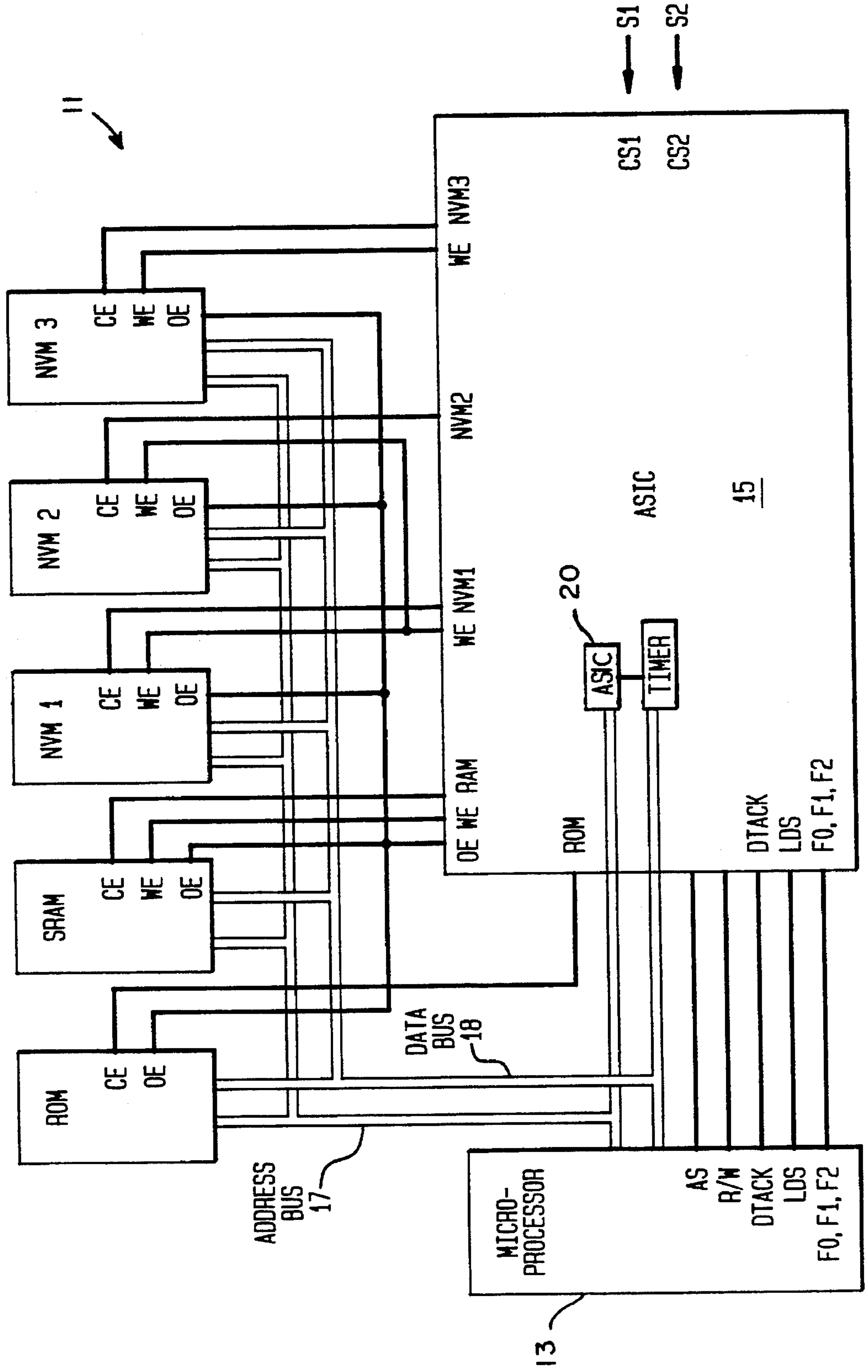
FIG. 1 is a schematic of a microprocessor control system including an ASIC in accordance with the present invention.
Figure 2:
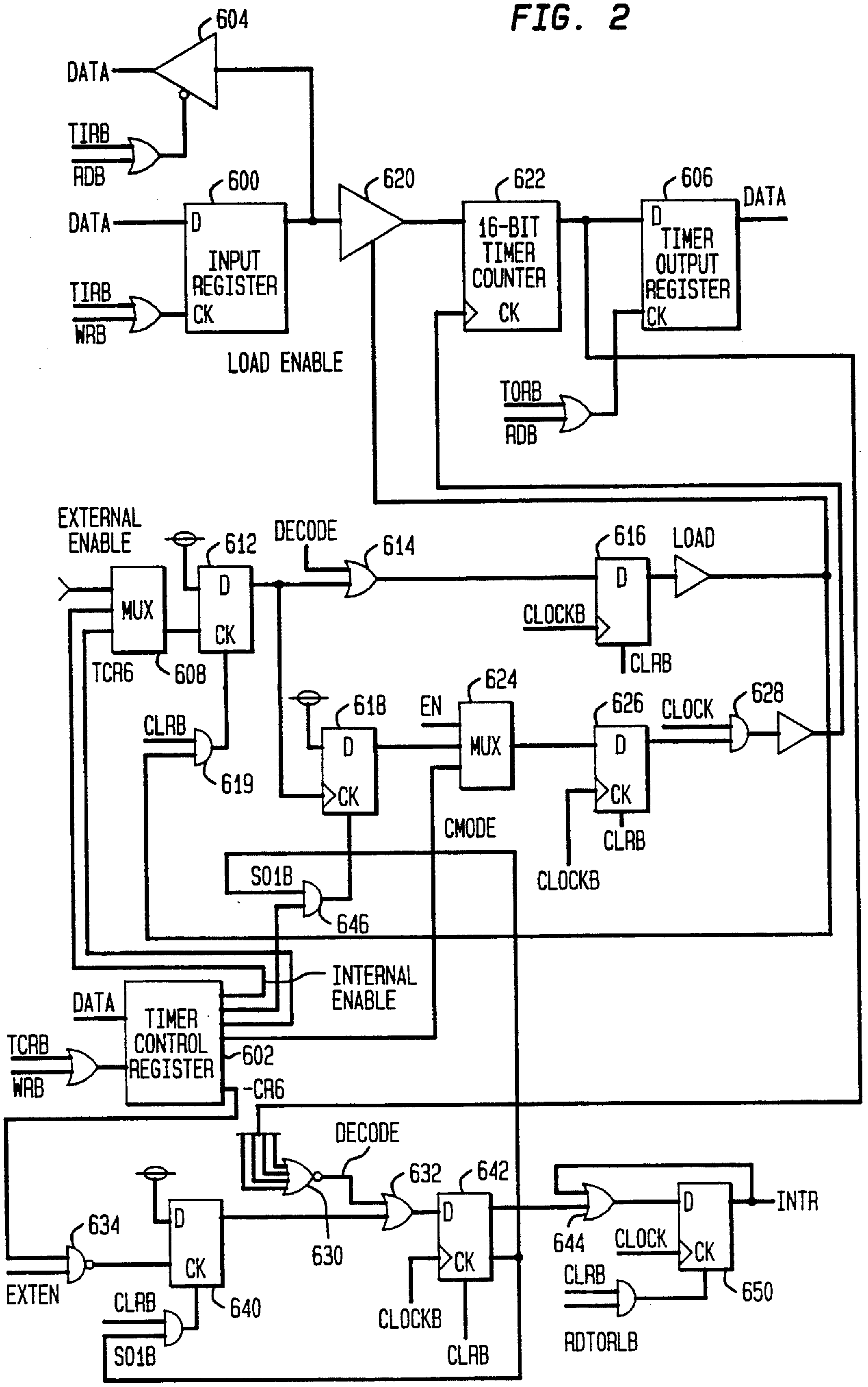
FIG. 2 is a schematic of a timer circuit in accordance with the present invention.

Referring to FIG. 1, a micro-controller system, generally indicated as 11, is comprised of a microprocessor 13 in bus 17 and 18 communication with an application specific integrated circuit (ASIC) 15, a read only memory (ROM), a random access memory (RAM) and a plurality of non-volatile memories (NVM1, NVM2, NVM3). The microprocessor 13 also communicates with the ASIC 15 and memory units by way of a plurality of control lines, more particularly described subsequently. It should be appreciated that, in the preferred embodiment, the ASIC 15 includes a number of circuit modules or units to perform a variety of control functions related to the operation of the host device, which, in the present preferred embodiment, the host device is a postage meter mailing machine.

Referring to FIGS. 2 through 5, the timer circuit will be described in accordance with the timer process flow diagrams. In order to set the 16-bit timer, as illustrated in FIG. 3*a*, the microprocessor addresses the ASIC decoder 20 and latches the timer data on the data bus 17. The address decoder 20 then enables the write signal which then allows the timer data on the data bus 17 to be loaded into the input register 600 and mode data into the timer control register 602. The mode data is that data which enables the timer for continuous mode or a one-shot mode which will be further described later. After the data is loaded into the input register 600, the address decoder 20 then enables the RDB signal which enables gate 604, which then enables the microprocessor to read the data and compare the data such as to confirm that the proper timer data has been written to the timer input register 600.

Figure 4:
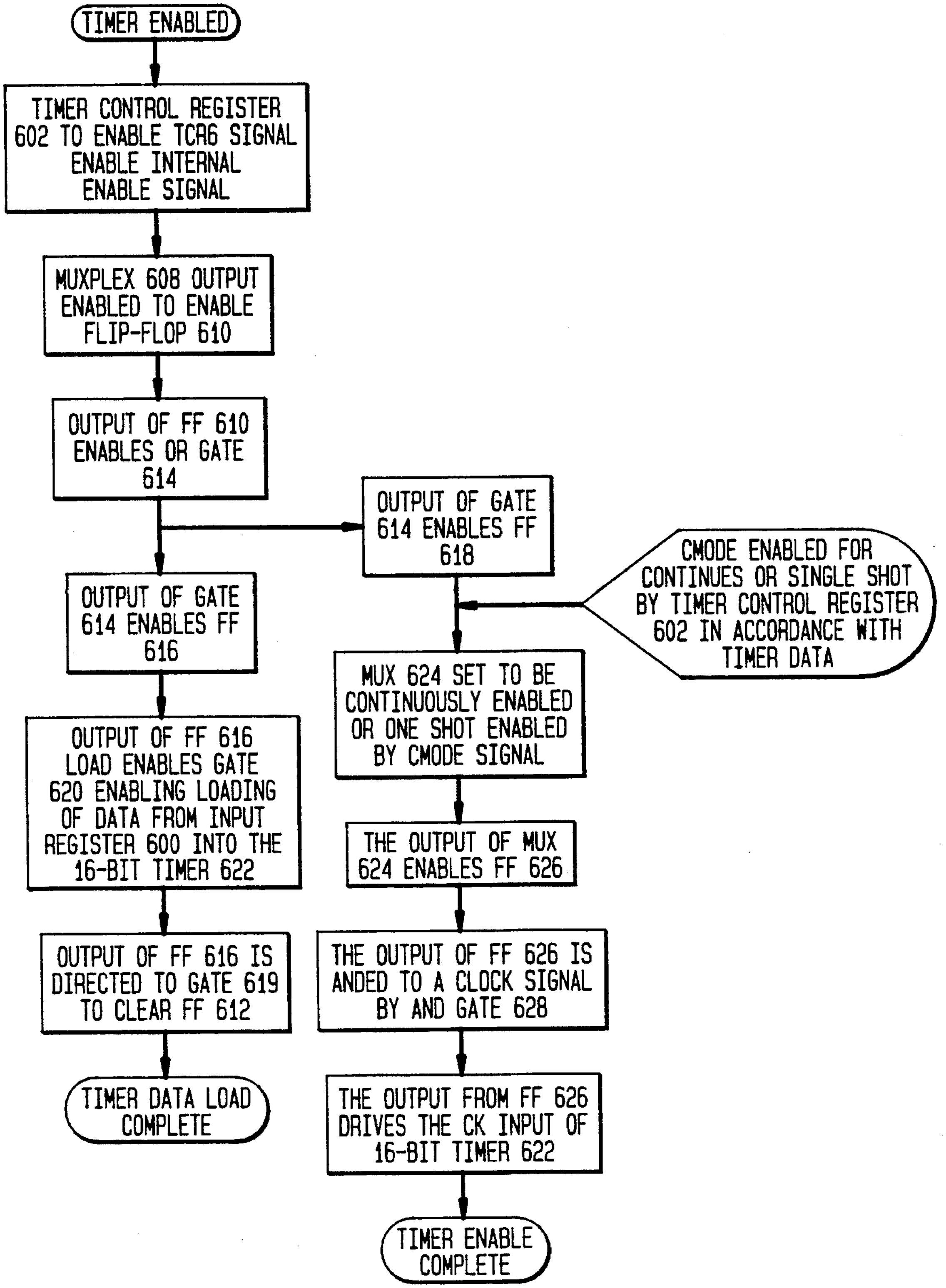
FIG. 4 is a process flow diagram of the timer enable circuit in accordance with the present invention.

In order to enable the timer 622, as illustrated in FIG. 4, the timer control register 602 is enabled by the TCR6 signal from the timer control register 602 which enables the internal enable signal. This signal is delivered to multiplexer 608 whose output then enables the flip-flop 612. The output of flip-flop 612 enables OR gate 614 and flip-flop 618. The output of flip-flop 616 enables gate 620 which enables loading of data from the input register 600 into the 16-bit timer 622. The output of flip-flop 616 also is directed to gate 619 to clear flip-flop 612 which signals the completion of the timer data load. Referring back to the output of flip-flop 612 which enables flip-flop 618, the multiplexer 624 is set to be continuously enabled or to be one-shot enabled by the C mode signal from the timer control register 602. In the single shot mode the input of the multiplexer 624 is set to receive the output from flip-flop 618. In the continuous mode the input of the multiplexer 624 is set to receive a continuous enable (EN). Optionally, the timer enable issued can be supplied externally to allow measuring intervals of events.

Figure 5:
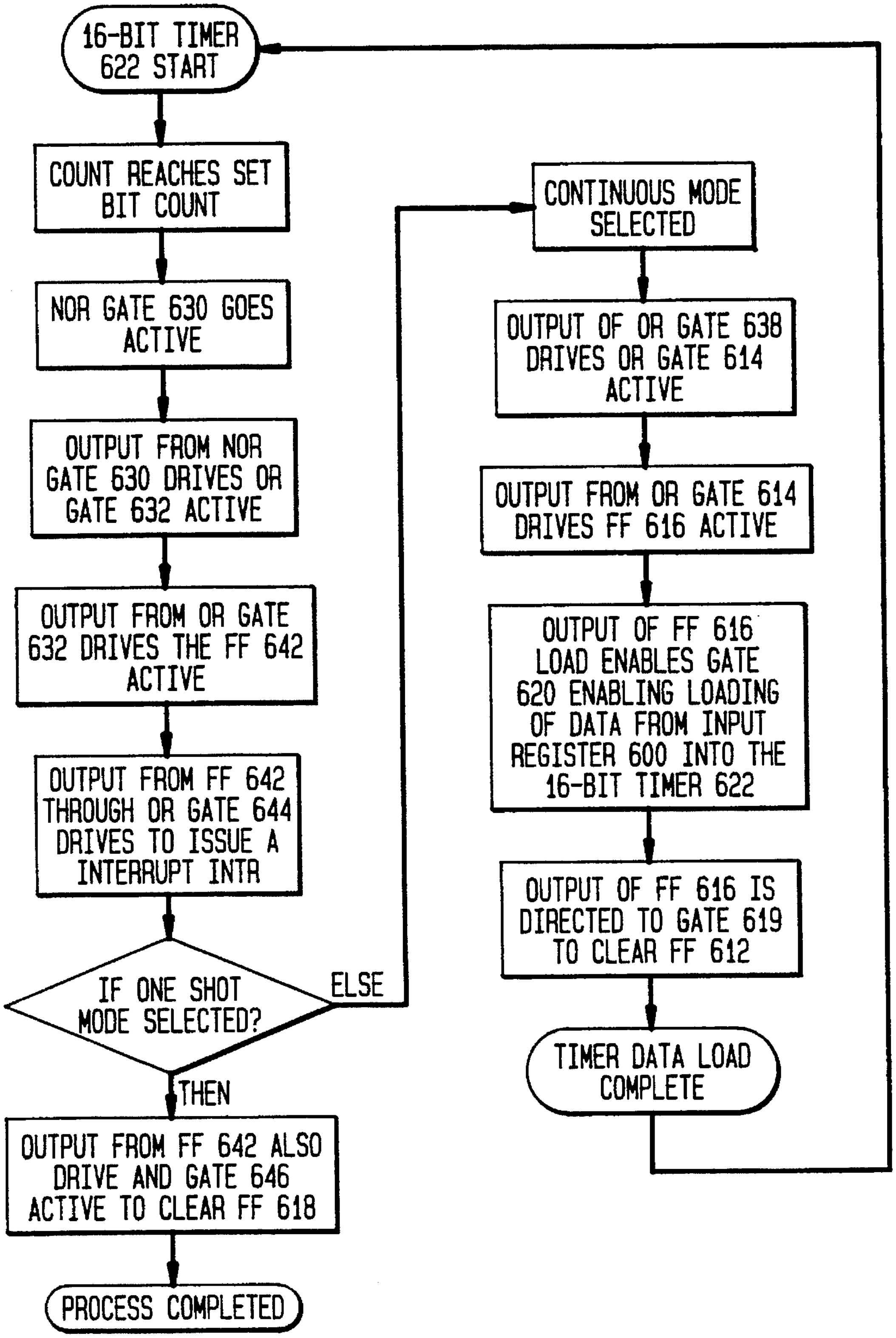
FIG. 5 is a process flow diagram for starting and restarting the timer in accordance with the present invention.

As noted, if the multiplexer 624 has been set the one-shot mode, then the output of flip-flop 618 is the input signal to the multiplexer 624. The output of the multiplexer 624 enables flip-flop 626 which is AND to a clock signal by AND gate 628. The output from flip-flop 626, in combination with the clock signal, drives the clock input of the 16-bit timer 622. At this point, timer enable is complete and the timer is initiated for counting. As illustrated in FIG. 5, when the timer 622 reaches the set bit count loading to the timer counter 622 from the input register 600, OR gate 630 goes active. When the OR gate 630 goes active, the output from the OR gate 630 drives OR gate 632 which in turns drives the flip-flop 642 active. The output from flip-flop 642, through an OR gate 644, drives flip-flop 650 to issue an interrupt to the micro-controller system to indicate that the timer has timed out. If a one-shot mode is selected then the output from flip-flop 642 also drives an AND gate 646 which goes actives to clear flip-flop 618. Once flip-flop 618 is cleared, the AND gate 628 goes inactive, therefore stopping clocking of the 16-bit timer counter 622. And the process is completed.

If a continuous mode has been selected then the output of OR gate 630 drives OR gate 614 active. The output from OR gate 614 drives flip-flop 616 active which then actuates the gate 620 which enables reloading of data from the input register 600 into the 16-bit counter. The output from flip-flop 616 is again directed to gate 619 to clear flip-flop 612 and the timer load is complete, and the timer then starts counting again. The enable signal to the multiplexer 624 is continuous, therefore, the clock signal provided at AND gate 628 is continuously provided to clock the timer 622.

Figure 3A:
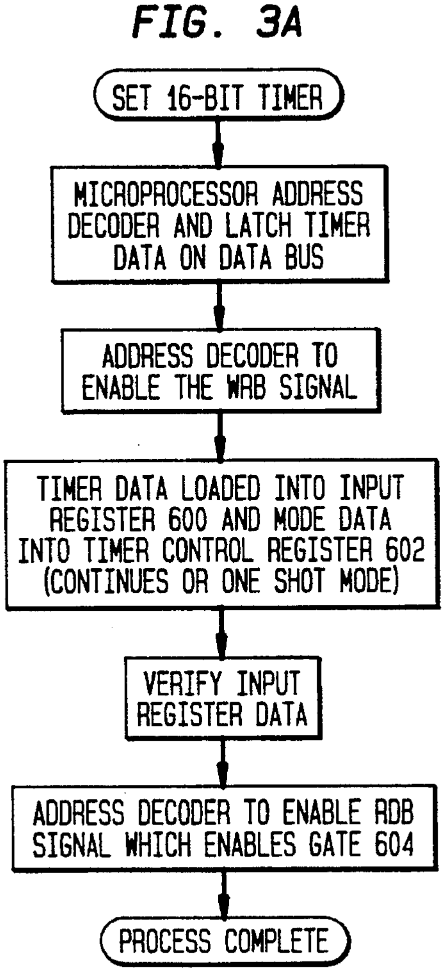
FIG. 3*a* is a process flow diagram for setting of the timer in accordance with the present invention.
Figure 3B:
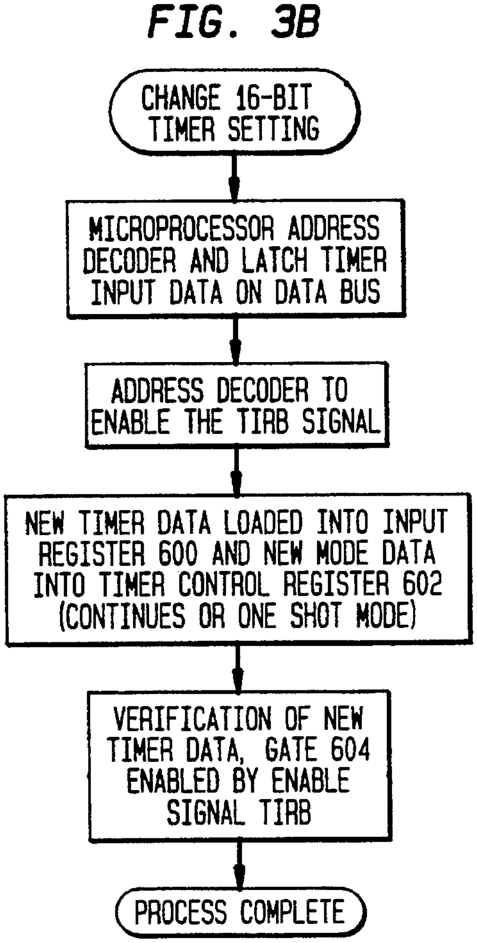
FIG. 3*b* is a process flow diagram for changing the setting of the timer in accordance with the present invention.
Figure 3C:
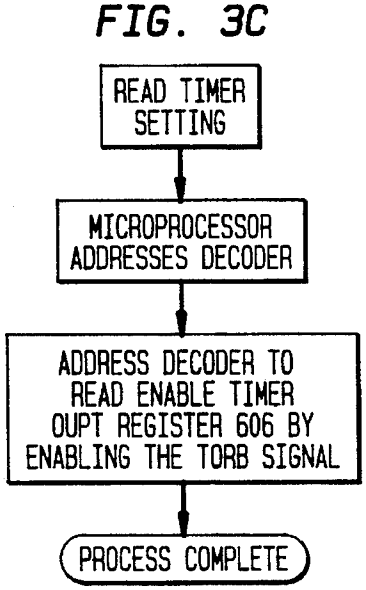
FIG. 3*c* is a process flow diagram for reading the setting of the timer in accordance with the present invention.

In order to change the 16-bit timer setting, as illustrated in FIG. 3*b*, it is not necessary to disturb the count. While the timer is running, the microprocessor 13 can address the decoder 20 and latches the new timer input data on the data bus. The address decoder 20 then enables the TIRB signal. When the TIRB signal goes active, the new timer data is loaded into the input register 600 and new mode data into the timer control register 602. Verification of the new timer data can be accomplished by since gate 604 is enabled by the TRIB signal which allows the data written into the input register 600 to be read by the microprocessor through gate 604.

It is also possible to read timer data from a timer output register 600 without disturbing the timer count of the timer 622. In order to read the timer setting, as illustrated in FIG. 6, it is necessary that the microprocessor 13 address the address decoder 20, the address decoder 20 then read/enables the timer output register 606 by enabling the TROB signal which places the data which is in the timer register 606 on the data bus for reading by the microprocessor 13.

Figure 3D:
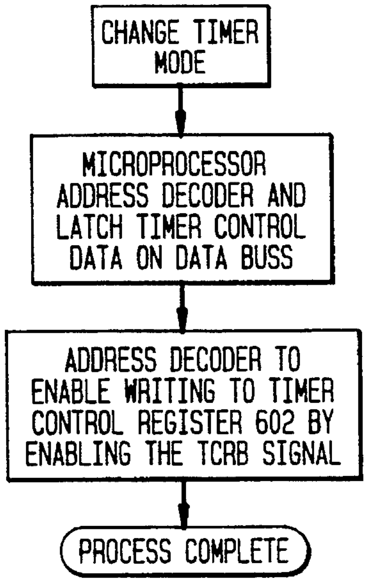
FIG. 3*d* is a process flow diagram for changing the timer mode of the timer in accordance with the present invention.

The timer mode can also be changed independently when the microprocessor addresses the decoder 20 and latches the timer control data on the data bus, as illustrated in FIG. 3*d*. The address decoder 20 then write/enables the timer control register 602 by enabling the TCRB signal for writing of new mode data into the timer register. It should now be appreciated that the present invention allows for the timer to be set to either programmable and selectable to be either single or continuous mode of operation.

What is claimed is:

1. A programmable timer circuit for a microprocessor control system having a programmable microprocessor, memory means and an integrated circuit, said microprocessor being in bus communication with said memory means and said integrated circuit, comprising:

said memory means having stored therein count data and mode selection data;

clock means for providing a clock signal;

said integrated circuit having a plurality of modules and data registers, one of said modules being a programmable timer circuit;

said microprocessor being programmed to read upon system power-up said count data and said mode selection data from said memory means and write said data in respective one's of said data registers of said integrated circuit and having enabling means for enabling and disabling said programmable timer circuit;

said programmable timer circuit, being responsive to said enabling means to be in an enabled or disabled state and said clock signal, when said programmable time circuit is enabled, having a timer counter for generating an output signal after said timer counter has reached a count corresponding to said count data, and having control means for gating said count data to said timer counter on a one-shot basis in response to a first state of said mode selection data or repeatedly and continuously gating said count data to said timer counter when said mode selection data is in a second state after said timer counter has reached said count corresponding said count data wherein each gate of said count data to said timer counter causes said timer counter to reinitiate said count.

2. A programmable timer circuit as claimed in claim 1 further comprising interrupt means responsive to generation of said output signal of said timer counter for informing said programmable microprocessor each time said timer counter of said programmable timer counter means has counted to said count.

* * * * *